United States Patent [19]

Gill et al.

[11] Patent Number: 5,557,492
[45] Date of Patent: Sep. 17, 1996

[54] THIN FILM MAGNETORESISTIVE HEAD WITH REDUCED LEAD-SHIELD SHORTING

[75] Inventors: Hardayal S. Gill, Portola Valley; David E. Heim, Redwood City, both of Calif.

[73] Assignee: International Business Machines Corporation, Armonk, N.Y.

[21] Appl. No.: 400,689

[22] Filed: Mar. 8, 1995

Related U.S. Application Data

[63] Continuation of Ser. No. 103,487, Aug. 6, 1993, abandoned.

[51] Int. Cl.$^6$ .............................................. G11B 5/39
[52] U.S. Cl. .............................................. 360/113
[58] Field of Search .............................. 360/113, 126, 360/121

[56] References Cited

U.S. PATENT DOCUMENTS

| | | | |
|---|---|---|---|
| 4,771,349 | 9/1988 | Tsang | 360/113 |
| 4,816,947 | 3/1989 | Vinal et al. | 360/113 |
| 4,825,325 | 4/1989 | Howard | 360/113 |
| 4,894,741 | 1/1990 | French | 360/113 |
| 4,987,514 | 1/1991 | Gailbreath et al. | 361/220 |
| 5,140,484 | 8/1992 | Maruyama | 360/113 |
| 5,247,413 | 9/1993 | Shibata et al. | 360/113 |
| 5,272,582 | 12/1993 | Shibata et al. | 360/113 |
| 5,375,022 | 12/1994 | Gill et al. | 360/113 |
| 5,424,890 | 6/1995 | Suyama et al. | 360/113 |

FOREIGN PATENT DOCUMENTS

| | | |
|---|---|---|
| 0457278A2 | 5/1991 | European Pat. Off. . |
| 62-33317 | 2/1987 | Japan .................. 360/113 |

*Primary Examiner*—A. J. Heinz
*Assistant Examiner*—Brian E. Miller
*Attorney, Agent, or Firm*—Baker, Maxham, Jester & Meador

[57] ABSTRACT

A magnetoresistive head is provided which includes a magnetoresistive thin film sensing element. The sensing element has film surfaces which are bounded by top and bottom surfaces and side surfaces, the bottom surface forming a portion of an air bearing surface. First and second thin film gap layers and first and second thin film shield layers are provided. The magnetoresistive element and between the first and second gap layers. The magnetoresistive element, the first and second gap layers are located between the first and second shield layers. One end of the MR element is electrically shorted to the first shield layer, and an opposite end of the MR element is electrically shorted to the second shield layer. This arrangement makes each shield layer serve as current carrying leads for the magnetoresistive head. By eliminating prior art current carrying lead layers, the electrical shorting problem is minimized because the gap insulation between the shields is twice the thickness of the gap insulation between the leads and the shields of prior art heads.

36 Claims, 8 Drawing Sheets

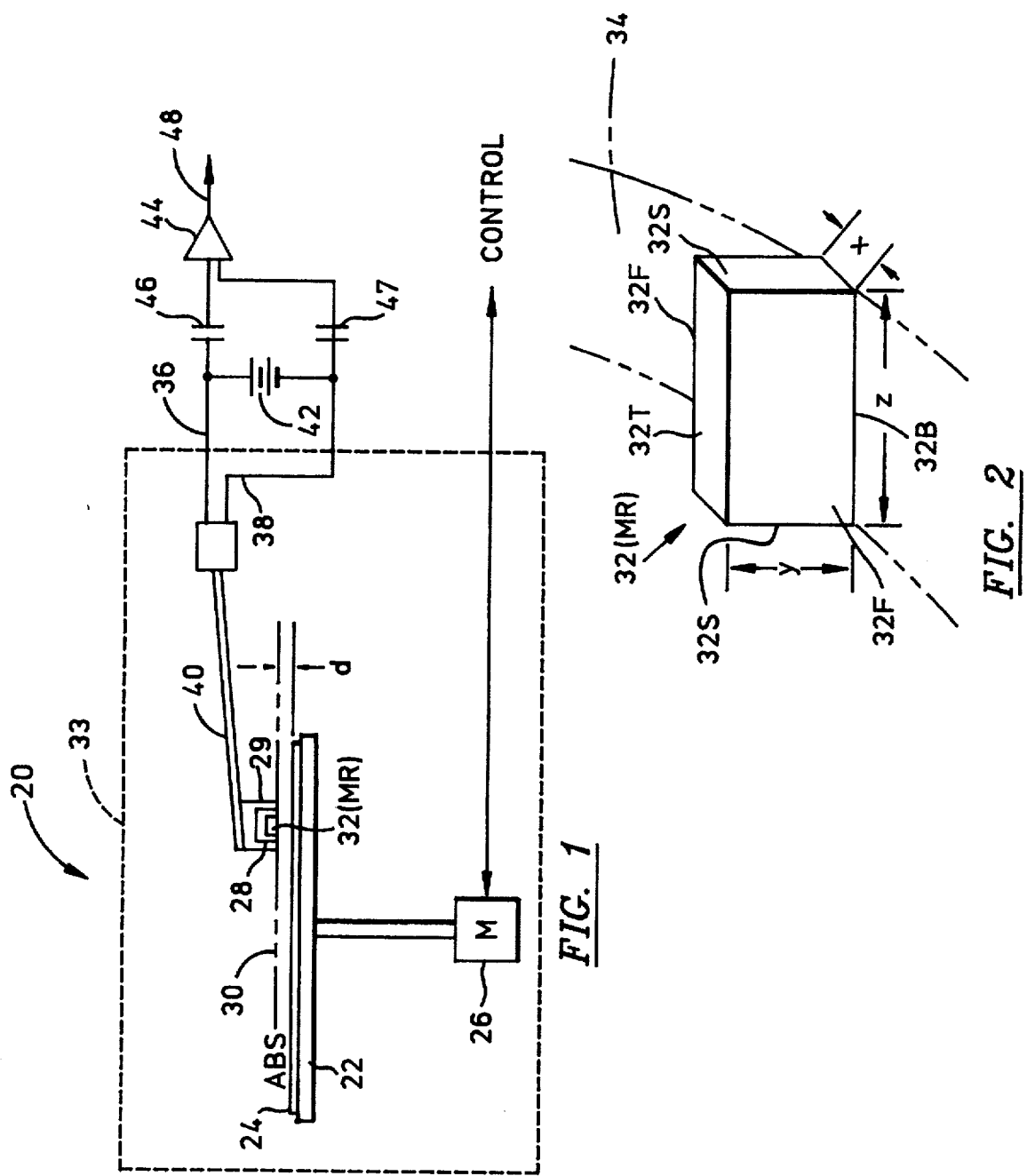

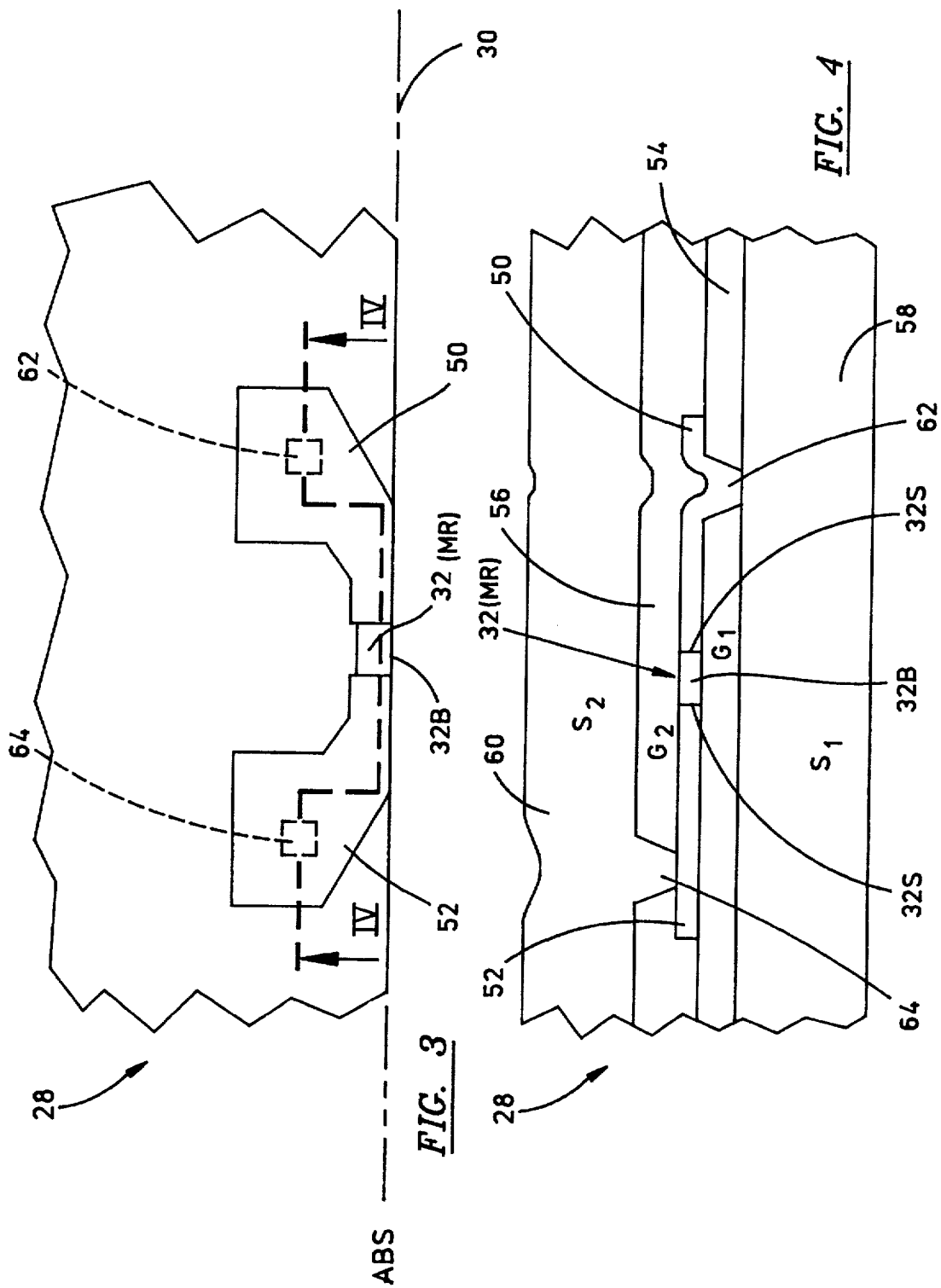

THIN FILM MAGNETORESISTIVE HEAD WITH REDUCED LEAD-SHIELD SHORTING

This application is a continuation, of application Ser. No. 08/103,487, filed Aug. 6, 1993, now abandoned.

BACKGROUND OF THE INVENTION

1. Field of the Invention

The present invention relates to a thin film magnetoresistive (MR) head with improved resolution, and more particularly to a thin film MR head which includes a small gap with electrically conducting shields for transmitting sense current to a magnetoresistive element.

2. Discussion of the Related Art

In the electromagnetic recording arts, thin film flux sensing heads are desirable because of their high areal density capability. They are also easy to manufacture. With various thin film manufacturing techniques, they can be fabricated in batches on a substrate and then cut into individual units. A head employs a magnetoresistive element which changes resistance in response to magnetic flux density from a rotating magnetic disk or a moving magnetic tape. A sensing current, which is passed through the magnetoresistive element, provides variation in voltage proportional to the change in resistance of the magnetoresistive element. The linear response of the magnetoresistive element is based on how well the resistance change of the magnetoresistive element follows the change in flux density sensed from the magnetic medium. In a disk or tape drive, a differential preamplifier is connected to the magnetoresistive element for processing the output signals from the read head.

The magnetoresistive element is a thin film layer which has its thin film faces bounded by top and bottom surfaces and side surfaces. The bottom surface, which is elongated, forms a part of an air bearing surface which flies above the plane of a magnetic disk, for example, when the disk is rotated. The magnetoresistive element is sandwiched between a pair of gap (insulation) layers which in turn are sandwiched between a pair of shield layers. The distance between the shield layers is called the gap. The smaller the gap, the greater the resolution of the MR head. A magnetic field is applied along a "hard" axis of the magnetoresistive element to improve its linear response and a magnetic field is applied along an "easy" axis of the magnetoresistive material to improve its stability (reduction of Barkhausen noise).

In order to provide a small gap, it is desirable to keep the gap layers adjacent the magnetoresistive element as thin as possible. However, in the prior art, the gap layers had to be made thick enough to avoid electrical shorting caused by pinholes which are an artifact of the manufacturing process. Pinholes allow electrical shorting from the lead layers, which form the leads of an MR head, to the shield layers via the gap layers. Such shorting is commonly referred to as "lead-to-shield shorting". The chance of shorting can take place anywhere along the full length of either lead layer. Any shorts between the lead layers and the shield layers via the gap layers destroy the impedance balance at the two terminals to the differential preamplifier. This imbalance destroys the common mode rejection of electrical noise capacitively coupled to the lead layers from the slider body. Lead-to-shield shorting seriously reduces performance of the MR heads and reduces head yield in the manufacturing process.

SUMMARY OF THE INVENTION

The present invention provides a thin film magnetoresistive (MR) head which has improved resolution and reduced lead-shield shorting. The thin film gap layers are thinner which provides a smaller gap (distance between the shield layers) for the magnetoresistive element. The reduced gap improves the resolution of the read head. This has been accomplished by providing a unique structural arrangement of the thin films within the magnetoresistive head which alleviates the problem with lead-shield shorts. The magnetoresistive sensing element portion of the read head has its film surfaces bounded by top and bottom edges and side edges, the bottom edge forming a portion of an air bearing surface. A pair of sense current thin film lead layers (also referred to as "leads") are provided. Each lead layer is electrically connected to a respective bounding surface of the magnetoresistive element. First and second thin film gap layers and first second thin film shield layers are provided. The magnetoresistive element and the lead layers are located between the first and second gap layers. The magnetoresistive element, the lead layers and the first and second gap layers are located between the first and second shield layers. An edge of the magnetoresistive element is electrically shorted to the first shield layer and an opposite edge is electrically shorted to the second shield layer. A pair of small connectors may be employed for making these connections. With this arrangement, the shield layers function as leads. The shield layers are separated by the composite of the two gap layers, and the probability that the pinholes in the two gap layers will align so as to short the two shield layers is greatly reduced.

Another feature of the invention is to substantially equalize the capacitance between the shield layers and the slider (substrate) which mounts the head. This is accomplished by electrically splitting the first shield layer into first and second portions. One edge of the magnetoresistive element is electrically shorted, as described above, to a first portion of the first shield layer. The second shield layer, which is electrically shorted to an opposite edge of the magnetoresistive element as described above, is also electrically shorted to the second portion of the first shield layer. The sizes of the first and second portions of the first shield layer are selected so that the capacitance of the first shield layer portion with respect to the slider is substantially equal to the capacitance of the second shield layer and the second portion of the first shield layer with respect to the slider. With the sizes of the shield layers properly chosen the capacitive coupling between the slider body and the two shield layers are equalized. For all practical purposes the first shield layer can be split in half to obtain substantially equal capacitive coupling since the capacitance between the second shield layer and the slider is minimal. This then restores the common mode rejection at the preamplifier.

An object of the present invention is to provide a magnetoresistive head which has a narrower gap than that provided by the prior art but which eliminates pinhole shorting of the magnetoresistive element lead layers to the shield layers in intermediate gap (insulation) layers of the head.

A further object is to accomplish the foregoing object and also to substantially equalize the capacitance between the shield layers, acting as lead layers, and a slider (substrate) which mounts the head so that common mode rejection will be improved at a preamplifier which receives signals from the head.

Still another object is to provide a magnetic disk drive which employs a magnetoresistive head of the type set forth in the foregoing objects.

Other objects will become apparent when considered in light of the following description of the invention.

BRIEF DESCRIPTION OF THE DRAWINGS

FIG. 1 is a schematic illustration of a magnetic disk drive, not to scale, which employs a thin film magnetoresistive head in conjunction with a preamplifier which receives and processes signals from the head during a read mode of operation.

FIG. 2 is a schematic illustration of the magnetoresistive element portion of a thin film head positioned above a track of a magnetic disk.

FIG. 3 is a schematic side view of a thin film magnetoresistive head, not to scale, with layers of the head removed to illustrate various details thereof.

FIG. 4 is a view taken along plane IV—IV of FIG. 3.

DETAILED DESCRIPTION OF THE PREFERRED EMBODIMENTS

Figure 5:
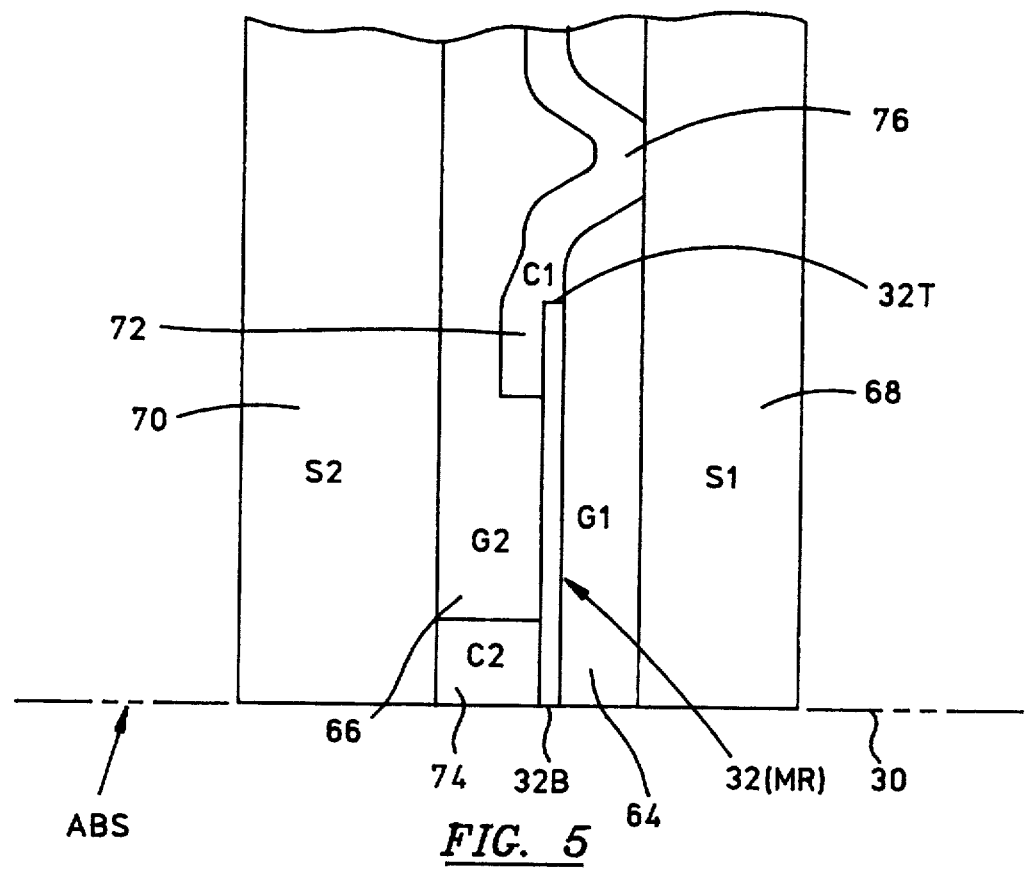
FIG. 5 is a schematic side view of another thin film magnetoresistive head, not to scale, with layers removed to illustrate various details thereof.

Referring now to the drawings wherein like reference numerals designate like or similar parts throughout the several views, there is illustrated in FIG. 1 a disk drive 20 which includes a turntable 22 for rotating a magnetic disk 24. The turntable 22 is rotated by a motor 26 which is responsive to control signals from a drive control source (not shown). When the magnetic disk 24 is rotated by turntable 22, a magnetic head 28, which is mounted on a slider (substrate) 29, is supported above the plane of the magnetic disk 24 by an air bearing. Bottom surfaces of the slider 29 and the head 28 are in a plane which is called the air bearing surface. The air bearing surface 30 is spaced above the top plane of the magnetic disc 24 by a distance d when the magnetic disk is rotating. The magnetic head 28 includes a thin film magnetoresistive element 32. All of these components are mounted in a disk housing 33 which may include other disks and heads (not shown). In FIG. 2 the magnetoresistive element 32 is shown in relationship to a single track 34 of the magnetic disk 24. The magnetoresistive element 32 has a pair of oppositely directed film surfaces 32F which are bounded by top and bottom edges 32T and 32B, and side edges 32S. The bottom edge 32B, which is elongated with a length z and a width x, forms a portion of the air bearing surface 30. As shown in FIG. 2, the magnetoresistive element 32 has a height y.

The magnetoresistive element 32 includes a thin film of material, such as nickel iron (NiFe), which changes resistance proportionately to the degree of flux density sensed by the element 32 as the track 34 of the magnetic disk 24 rotates below the air bearing surface 30. The accuracy to which the resistance of the magnetoresistive element 32 follows the changing flux densities from the magnetic disk track 34 determines the linear response of the magnetoresistive element 32. A pair of leads 36 and 38 are connected to the magnetoresistive element 32 via an arm 40 which mounts the slider 29. Connected to the leads 36 and 38 is a current source 42 for applying a sense current to the magnetoresistive element 32. The sense current, which carries the signal, is responsive to the resistive changes of the magnetoresistive element. The current can be passed through the magnetoresistive element either parallel to or perpendicular to the plane of the magnetic disk 24. The leads 36 and 38 connect to a preamplifier 44 via capacitors 46 and 47. During a read mode of operation, sense voltage is provided to the preamplifier 44 by way of the lead 36. The output of the preamplifier 44 at 48 is an amplified signal representative of the flux densities sensed by the magnetoresistive element 32 from the rotating magnetic disk 24.

As shown in FIG. 2, the track 34 travels broadside to the magnetoresistive element 32. Accordingly, the length z of the magnetoresistive element 32 extends laterally across the width of the track 34. The effective length z determines the track width which will be sensed by the magnetoresistive element 32. The resolution of the readback signal by the magnetoresistive element 32 depends upon the width of the gap of the magnetoresistive head 28. The width of the gap, in turn, depends upon the thickness of the gap layers which insulate the film surfaces 32F of the magnetoresistive element from the shield layers plus the thickness x of the magnetoresistive element 32 (see FIG. 2). The gap layers will be described in detail hereinafter. The shield layers in essence focus the sensing capabilities of the magnetoresistive element 32 within a confined area of the track 34 of the disk 24 (see FIGS. 1 and 2). The thinner the gap layers, the more confined this area is and the greater the resolution of the readback signal as read by the magnetoresistive element 32. One of the features of this invention is to provide gap layers which are very thin so that the resolution of the magnetoresistive element 32 is improved with respect to prior art magnetoresistive elements in an architecture which minimizes lead-to-shield shorting.

FIGS. 3 and 4 are simplified schematic illustrations of a portion of one embodiment of a magnetoresistive head 28 to illustrate features of the present invention. This embodiment employs a sense current which travels along the magnetoresistive element 32 parallel to the plane of the magnetic disk 24 (see FIG. 1) and parallel to the air bearing surface 30. As stated hereinabove with reference to FIG. 2, the magnetoresistive element 32 has film surfaces 32F which are bounded by top and bottom surfaces 32T and 32B, and side surfaces 32S. As shown in FIG. 3, the bottom surface 32B of the magnetoresistive element 32 forms a part of the air bearing surface 30. First and second sense current thin film connector layers 50 and 52 are provided, the first connector layer 50 being electrically connected to one of the magnetoresistive element edges 32S, and the second connector layer 52 being electrically connected to the other side 32S of the magnetoresistive element. First and second thin film gap (insulation) layers 54 and 56 are provided, and first and second thin film shield (conductor) layers 58 and 60 are provided. The magnetoresistive element 32 and the connector layers 50 and 52 are sandwiched between the gap layers 54 and 56 in direct film surface to film surface engagement, and the gap layers 54 and 56 are sandwiched between thin film shield layers 58 and 60 in direct film surface to film surface engagement.

The problem with prior magnetoresistive heads can best be understood by referring to FIG. 4. It is desirable that the gap layers 54 and 56 be as thin as possible so that the gap width (distance between the shield layers 58 and 60) for the magnetoresistive element 32 is as narrow as possible. The shield layers 58 and 60, which are magnetic material, confine magnetic flux from the rotating magnetic disk to the gap space provided by the gap layers 54 and 56. The narrower the gap, the greater the resolution of the magnetoresistive element 32. With prior art technology, there is a serious limitation on the thinness of the gap layers 54 and 56. The thinner the gap layer, the more likelihood there is that a pinhole will exist in the gap layer, thereby shorting one of the connector layers of the prior art to one of the shield layers 58 or 60. Consequently, the prior art constructs the gap layers 54 and 56 with a sufficient thickness to avoid holes which cause the shorts. This, of course, makes the gap wider and reduces the resolution of the magnetoresistive element 32.

The present invention has overcome this problem by electrically shorting one edge of the magnetoresistive element to the first shield layer 58 at 62 and electrically shorting an opposite edge of the magnetoresistive element to the second shield 60 at 64 by connectors 50 and 52. This may be accomplished by providing the first connector 50 with a via 62 which extends through the first gap layer 54 to the first shield layer 58, and by providing the second shield layer 60 with a via 64 which extends through the second gap layer 56 to the second connector 52. The distance between each edge surface 32S of the magnetoresistive element to the respective via can be in the order of 5 microns. This virtually eliminates the potential of a pinhole in one of the gap layers 54 or 56 allowing a short from one of the connectors 50 or 52 to one of the shield layers 58 or 60. With this arrangement, each gap layer 54 and 56 can be constructed with a thickness in the range of 0.05 um to 0.2 um. Gap layers of this thickness will provide a very narrow width gap for the magnetoresistive element 32 which will produce a high resolution reading of the magnetic disk. Each of the gap layers 54 and 56 are insulation layers which can be made of aluminum oxide. If lead layers of the prior art are fabricated to provide the connectors 50 and 52 a remainder of the connector layers 50 and 52, construction of after the vias 62 and 64, can be removed immediately after the vias or within 5 microns thereafter during the construction of the head.

Figure 6:
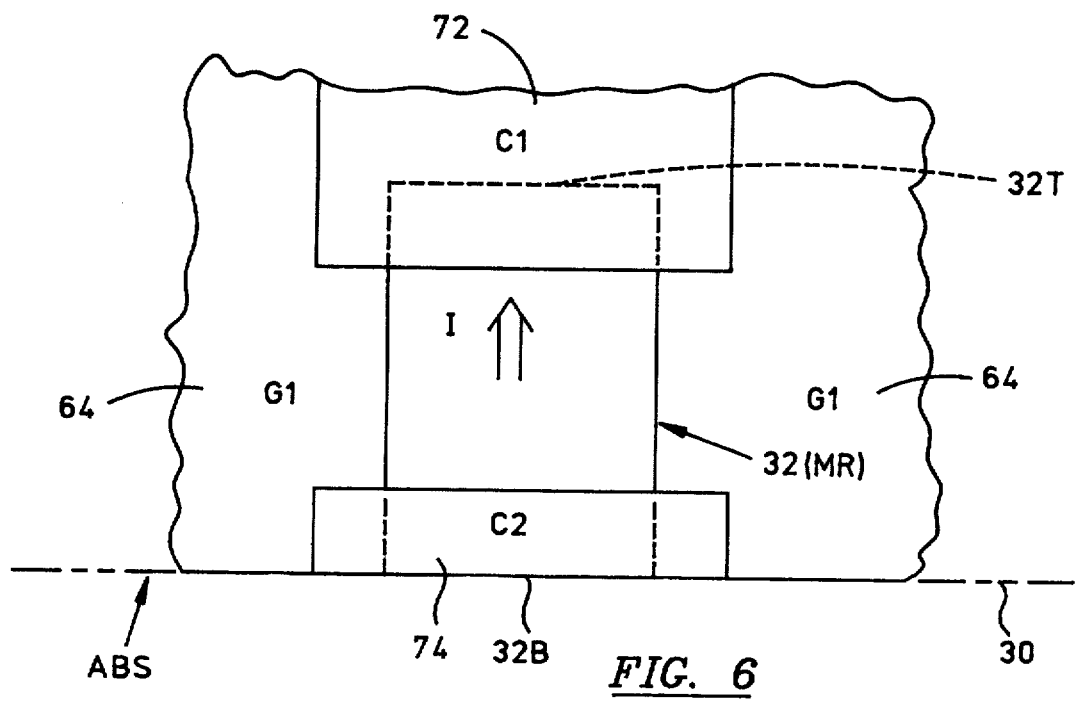
FIG. 6 is a planar view of some of the thin films illustrated in FIG. 5 to show various details thereof.

FIGS. 5 and 6 are simplified schematic illustrations of a portion of another embodiment which employs the narrow gap feature of the present invention. As stated hereinabove, the magnetoresistive element 32 has an elongated bottom edge 32B which forms a part of the air bearing surface 30. The magnetoresistive element 32 is located between first and second gap layers 64 and 6 which are, in turn, located between first and second shield layers 68 and 70. The FIGS. 5 and 6 embodiment differs from the FIGS. 3 and 4 embodiment in several respects. The connectors 72 and 74 are connected to the magnetoresistive element 32 adjacent its top and bottom surfaces 32T and 32B. These connections transmit the sense current through the magnetoresistive element 32 in a direction which is perpendicular to the air bearing surface 30 and which is perpendicular to the plane of the magnetic disk 24 (see FIG. 1). The first connector 72 has a via 76 which extends through the gap layer 64 to short the first connector 72 to the first shield layer 68. The second connector 74 extends completely through the second gap layer 66 and is electrically connected to the second shield layer 70. With this arrangement, the gap layers 64 and 66 can be thin to provide a narrow gap for the magnetoresistive element 32. The size of the connectors 72 and 74 can be minimized during the construction of the head. If a prior art type lead layer has been fabricated, it can be removed immediately or shortly after the via 76. The width of both connectors across the end portions of the magnetoresistive element 32 can be the same width as the element or slightly wider, such as 10 microns wider.

Figure 7:
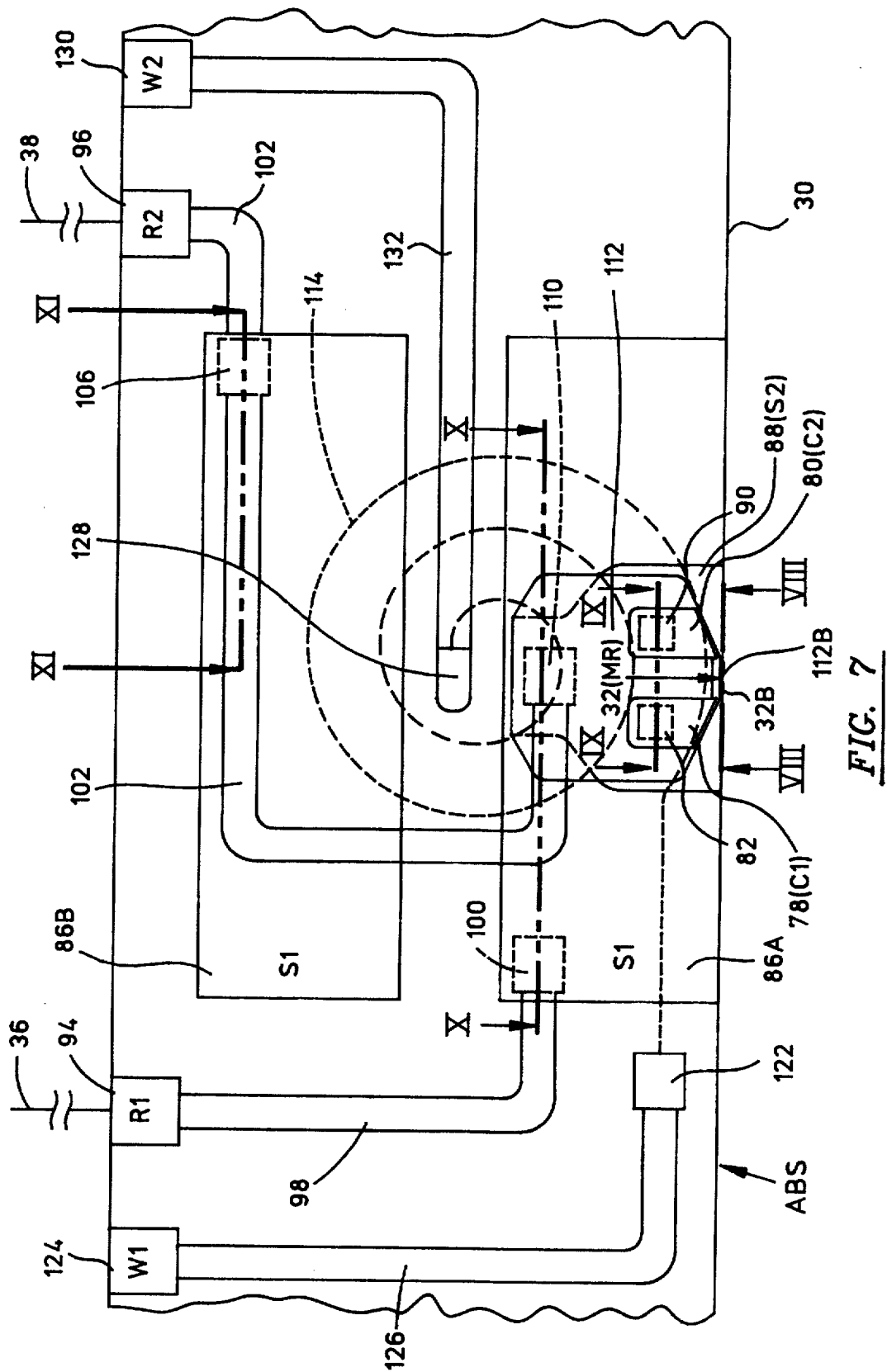
FIG. 7 is a schematic film surface view, not to scale, of portions of a more complete thin film magnetoresistive head.
Figure 8:
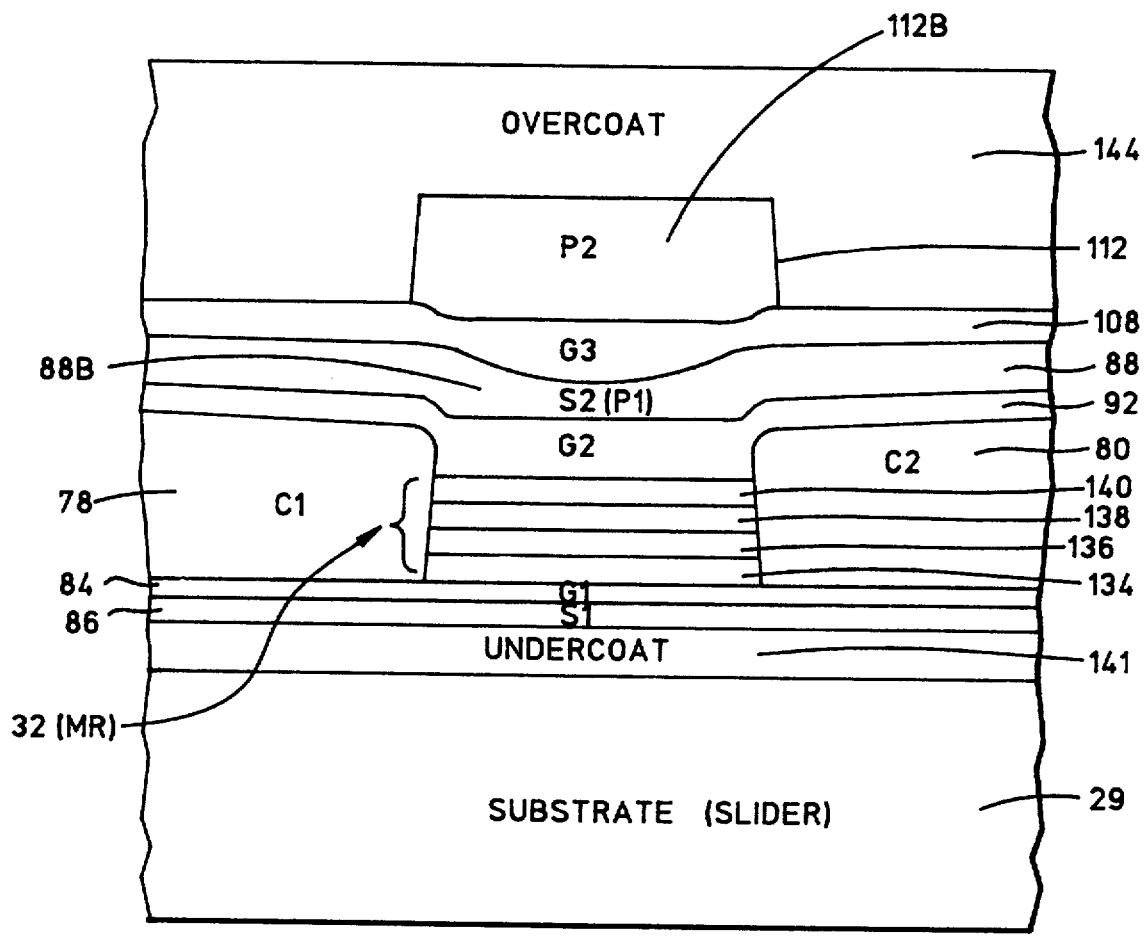
FIG. 8 is a view taken along plane VIII—VIII of FIG. 7.
Figure 9:
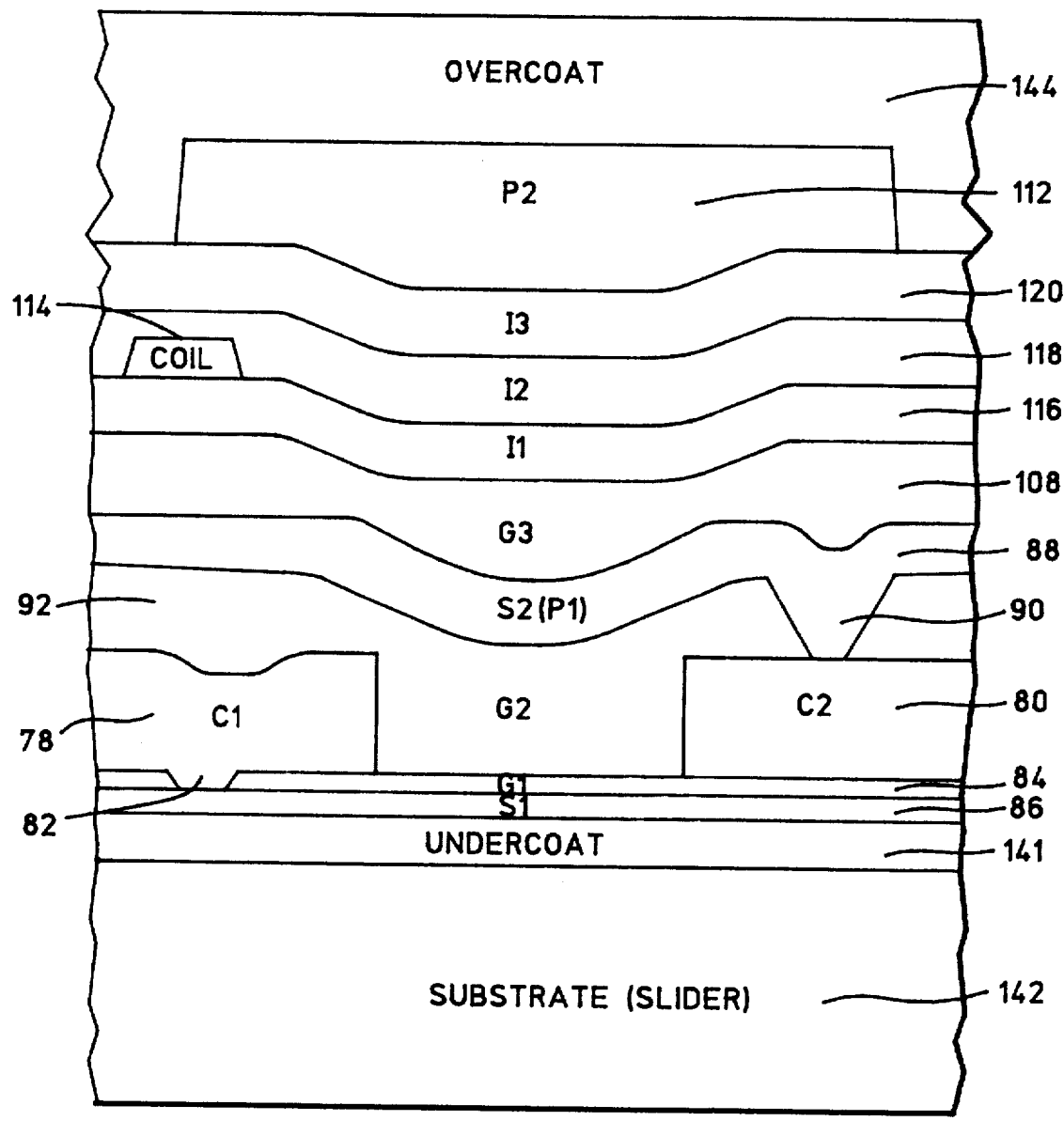
FIG. 9 is a view taken along plane IX—IX of FIG. 7.

A more complete embodiment of the present invention is illustrated schematically in FIGS. 7 through 11. This embodiment has a magnetoresistive element 32 which, as stated hereinabove, has a elongated bottom edge 32B which forms a portion of the air bearing surface 30. Like the FIGS. 3 and 4 embodiment, the sense current is transmitted along the magnetoresistive element 32 in a direction parallel to the air bearing surface 30 and parallel to the plane of the magnetic disk 24 (see FIG. 1). The sense current is applied by the shield layer connector layers 78 and 80 are connected to respective edges 32s (see FIG. 4) of the magnetoresistive element. As shown in FIGS. 7 and 9, the first connector layer 78 has a via 82 which extends through a first gap layer 84 to electrically short the connector layer 78 to a first shield layer 86. A second shield layer 88 has a via 90 which extends through a second gap layer 92 to electrically short the second connector layer 80 to the second shield layer 88. With this arrangement, the first and second shield layers 86 and 88 now serve as lead layers, as discussed in the prior art, which extend from the respective vias 82 and 90.

Figure 10:
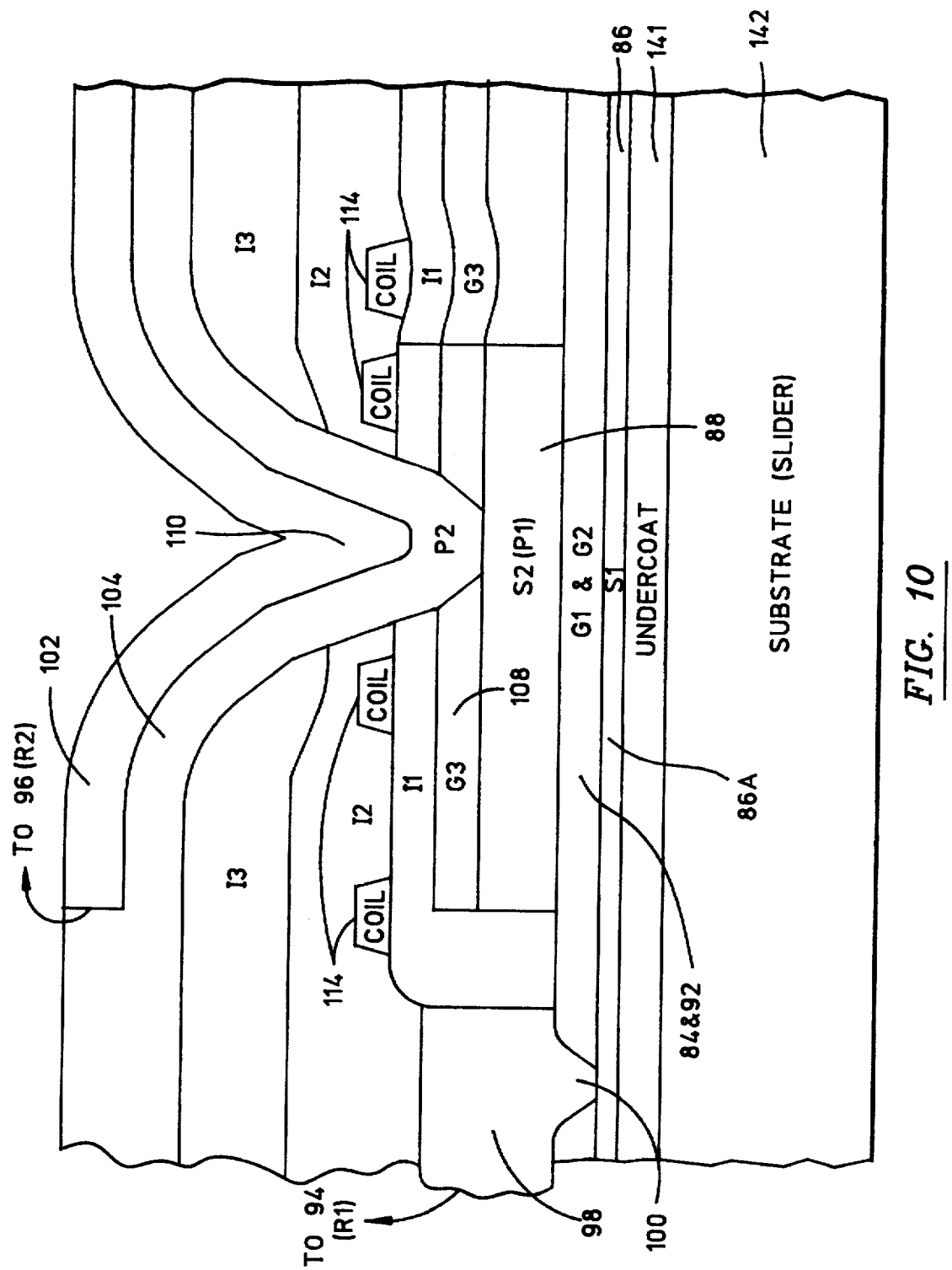
FIG. 10 is a view taken along plane X—X of FIG. 7.

As shown in FIGS. 7 and 10, a first terminal 94 is connected to a portion 86A of the first shield layer, which portion will be described hereinafter, and a second terminal 96 is connected to the second shield layer 88. The terminal 94 is connected to the first shield layer portion 86A by a thin film lead layer 98 which makes a via 100 extending through the gap layers 84 and 92 (see FIG. 10) to the first shield layer portion 86A. Also, as shown in FIG. 7 and 10, the terminal 96 is connected to the second shield layer 88 by a thin film connector layer 102 which is electrically connected to the second shield layer 88 via a write pole layer 104. The write pole layer 104 will be discussed in more detail hereinafter. With this arrangement the leads 36 and 38, shown in FIG. 1, are connected to the terminals 94 and 96 and a read output is provided from the head 28.

As shown in FIGS. 8–11, the head 28 is mounted on a substrate 29 (see FIG. 1). The substrate is also known as a "slider" because it forms a portion of the air bearing surface 30 and slides on or flies on an air bearing above the plane of the magnetic disk 24. Since the substrate is quite large in comparison to the thin films of the head 28 it can pick up large amounts of stray fields which result in noise at the preamplifier 44. This noise can be eliminated by common mode rejection. This common mode rejection depends upon the capacitive coupling between each of the first and second shield layers 86 and 88, now acting as lead layers to the terminals 94 and 96, and the large substrate layer 29. The capacitance between the second shield layer 88 and the substrate 29 is small in comparison to the capacitance between the first shield layer 86 and the substrate. This is because the second shield layer 88 is farther away from the substrate 29 than the first shield layer 86 (see FIG. 10) and its area can be made small during construction (about ⅙ the area of the total area of the first shield layer 86), as seen in FIG. 7.

Figure 11:
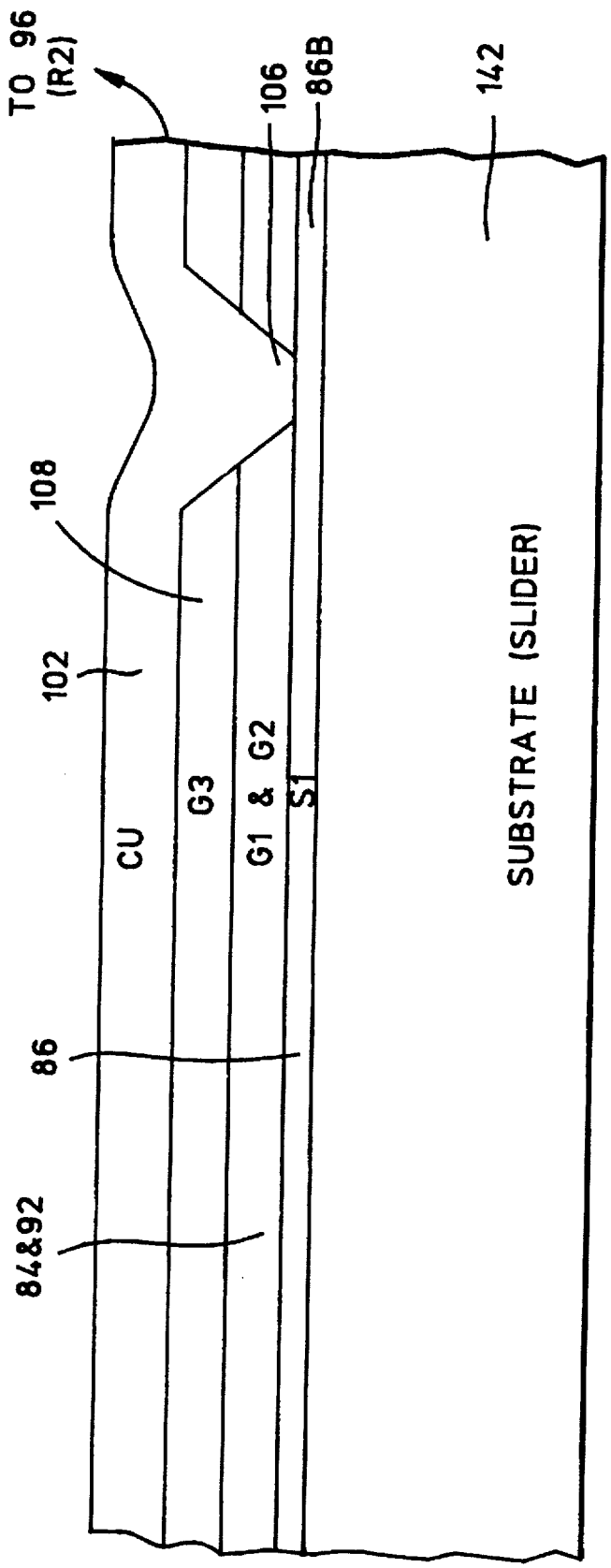
FIG. 11 is a view taken along plane XI—XI of FIG. 7.

For all practical purposes the first shield layer 86 controls the capacitance seen at the terminals of the preamplifier 44. Accordingly, in the preferred embodiment of the invention, the first shield layer 86 is equally split into two portions 86A and 86B, as shown in FIG. 7. The portion 86A is connected to the first terminal 94 and the portion 86B is connected to the second shield layer 88 and the second terminal 96. As can be seen from FIGS. 7 and 10, the thin film connecting layer 98 connects the first terminal 94 with the first shield layer portion 86A by a via 100 which extends through the gap layers 84 and 92. As can be seen in FIGS. 7 and 11, a thin film connecting layer 102 from the terminal 96 is provided with a via 106 which extends through a third gap layer 108, to be described hereinafter, and gap layers 84 and 92 to make electrical connection with the first shield layer portion 86B. As shown in FIGS. 7 and 10, the thin film connecting layer 102 continues on to the second shield layer 88 where it makes connection with the second shield layer 88 by a via 110 through various layers along with the write pole layer 104. The second terminal 96 now has electrical connection to the second shield layer 88 at 110 and electrical connection to the first shield layer portion 86B at 106. In contrast, the terminal 94 has electrical connection only to the first shield layer portion 86A at 100. Instead of equally splitting the first shield layer 86, the sizes of the first and second portions 86A and 86B of the first shield layer can be selected with the capacitance of the second shield layer 88 taken into account so that the capacitance of the first shield layer portion 86A with respect to the substrate 29 is exactly equal to the capacitance of the combination of the second portion of first shield layer 86B and the second shield layer 88 to the substrate. With the above teachings, the impedances at the terminals 94 and 96 are balanced so that there is proper common mode rejection of noise at the preamplifier 44.

In some instances, it may be desirable to provide a combination including separate read and write heads on the substrate 29. As shown in FIGS. 7 and 8, this is accomplished by providing first and second thin film write pole layers 88 and 112. The second shield layer 88 serves as the first write pole layer 88. Both of the write pole layers have respective bottom surfaces 88B and 112B which form a part of the air bearing surface 30. As seen in FIG. 8, the write pole layers 88 and 112 are separated by the gap (insulation) layer 108, the thickness of the gap layer determining the gap of the write head. As shown in FIGS. 7, 9 and 10, the write head may be provided with a thin film coil 114 which is separated from the first write pole layer 88 by the gap layer 108 and an insulation layer 116 and is separated from the second write pole layer 112 by insulation layers 118 and 120. As shown in FIG. 7, one end 122 of the coil 114 is electrically connected to a first write terminal 124 by a thin film connector 126, and the other end 128 of the coil is connected to a second write terminal 130 by a thin film connector 132. When varying currents are induced into the coil 114 by the write terminals 124 and 130, the write poles 88 and 112 are proportionately magnetized to induce corresponding flux densities into the magnetic surface of the magnetic disk 24.

As shown in FIG. 8, the magnetoresistive element 32 may be composed of four thin film layers. The first layer 134 may be a soft film bias layer which is constructed of a material selected from the group NiFeRh, NiFeCr, NiFeNb and NiFeMo. The second layer 136 is an insulation material. The third layer 138 is a magnetoresistive material, such as NiFe, which changes resistance in response to flux density. The fourth layer 140 is a protective layer for the third layer 138. The magnetic material of the first layer 134 is magnetized transverse to the air bearing surface 30. This provides a vertical or transverse bias field to the magnetoresistive element. Longitudinal bias, i.e. magnetic bias along the sense current axis, may be provided by a high coercivity, high moment magnetic thin film (not shown) under both of the leads. Assuming that the easy axis of the third layer 138 is in the direction of the sense current, the transverse bias improves the linear response of the head and the longitudinal bias improves performance by reducing Barkhausen noise which is caused by erratically moving domain walls. It should be understood that there are other arrangements which could be utilized to properly bias the third layer 138 to achieve improved reading performance.

A method of constructing the embodiment shown in FIGS. 7 through 11 and materials used in the construction may be as follows. As shown in FIGS. 7-11, the substrate layer 29 upon which the magnetoresistive element 32 is fabricated is usually a cermet material which is a composition of aluminum oxide and titanium carbide. An aluminum oxide undercoat layer 141, typically in the range of 2 to 10 microns, is deposited on the substrate. Then the first shield layer 86, which may be FeAlSi (Sendust), is sputter deposited over the entire wafer. This layer may be 2 microns thick. The first gap layer 84, which may be aluminum oxide, has a thickness range of 0.05 um to 0.2 um and is sputtered deposited over the entire wafer. An opening is made in the first gap layer 84 at 82 so that when the lead layer 78 is subsequently deposited it will make a via at 82 to the first shield layer 86. This opening as well as subsequent openings can be made by chemical etching.

The magnetoresistive element materials are deposited on the entire wafer. The element 32 may be composed of four thin films layers. The first layer 134 is a soft film bias layer normally in the thickness range of 25 Å and 400 Å and of a composition selected from any of the alloys NiFeRh, NiFeCr, NiFeNb, and NiFeMo. The second layer 136 is a spacer insulation material of either a high resistivity metal or a dielectric, such as Beta-Ta. The third layer 138 is a magnetoresistive material, such as NiFe, with a thickness in the range of 50 Å to 500 Å. The fourth layer 140 is generally a thin metal or an insulator to protect the third layer 138. All of these four thin film layers can be deposited in a single vacuum system. The four layers can be referred to as a magnetoresistive quadrilayer. The magnetoresistive quadrilayer is etched using a photolithography process from areas where the connector layers 78 and 80 are to be sputtered deposited. The connector layers 78 and 80 are then sputter deposited in these areas. The conductive layer material is selected from any of the metals Au, Ta, W, Rh, and Ru with a thickness in the range of 200 Å to 2000 Å depending on the nature of the application. Using photolithography and ion milling, the magnetoresistive quadrilayer is defined. The materials are etched from the unwanted areas.

The second gap layer 92, which may be aluminum oxide, may have a thickness in the range of 0.05 um to 0.2 um. It is deposited over the entire wafer. As stated hereinabove, the thickness of the first gap layer is also in the range of 0.05 to 0.2 um. This thickness is significantly less than the normal 0.5 um for each of the gap layers required by prior art read heads. The total gap, namely the thickness of the first and second gap layers 84 and 92, is known as the read gap for the magnetoresistive element 32. Because the invention allows these gap layers to be thinner the resolution of the head is significantly improved over prior art read heads.

As shown in FIG. 9, an opening is made at 90 in the second gap layer 92 The second shield layer 88 is then sputter deposited over the entire wafer and a via is provided at 90 to short the second connector layer 80 to the second shield layer 88. The second shield layer, which may be NiFe, is plated. This material is known as Permalloy. The second shield layer 88 is given its final shape, as shown in FIG. 7, by photolithographic and chemical etching processes. Then the first shield layer 86 is given its final shape (portions 86A and 86B ), as shown in FIG. 7, using photolithographic and chemical etching processes. The third gap layer 108, which may be aluminum oxide, is deposited over the entire wafer with a thickness in the range of 0.4 um to 0.6 um. As shown in FIGS. 10 and 11, openings are made at 110 and 106 in various layers to make connections of the connecting layer 102, from the second terminal 96, with the second shield layer 88 and the first shield layer portion 86B. As shown in FIG. 10, an opening 100 is made through the layers 84 and 92 to connect the connecting layer 98, from the first terminal 94, with the first shield layer portion 86A. The first insulation layer 116 of hard baked photoresist is then deposited. The write head coil 114 of copper conductor is put on using the photo and plating processes. The insulation layers 118 and 120 of hard baked photoresist are then deposited. The write pole 112 is plated and is defined, as seen in FIG. 7, using the photolithographic process. Also, the connections are established between the write terminals 124 and 130, as shown in FIG. 7, with the terminal ends 122 and 128 of the coil. The connections of the read and write terminals are established using copper plating and photolithographic processes. Finally, an overcoat 144 of aluminum oxide of a thickness in the range of 10 to 20 microns is deposited over the entire wafer. This layer is required to keep the integration of the head during the slider fabrication processes.

For further information on various aspects of the present invention reference is made to co-pending patent application, Ser. No. 08/103,500, filed on Aug. 6, 1993 simultaneously with the present patent application by Harry S. Gill and David Helm, which patent application is incorporated by reference herein.

Obviously, many modifications and variations of the present invention are possible in light of the above teachings. It is therefore to be understood that, within the scope of the appended claims, the invention may be practiced other than as specifically described.

We claim:

1. A thin film magnetoresistive head, comprising:

a magnetoresistive sensing element having first and second oppositely-directed thin film surfaces bounded by top and bottom bounding edges and side bounding edges, the bottom bounding edge forming a portion of an air bearing surface;

first and second sense current thin film connector layers, each connector layer being electrically connected to the magnetoresistive element in a spaced apart relationship;

first and second thin film gap layers and first and second thin film electrically conductive shield layers;

the magnetoresistive sensing element being located between the first and second gap layers;

the magnetoresistive sensing element, the first and second connector layers and the first and second gap layers being located between the first and second shield layers;

the first gap layer having a hole;

the first connector layer being electrically connected to the first shield layer through the hole in the first gap layer and the second connector layer being electrically connected to the second shield layer;

first and second output terminals; and the first shield layer being electrically connected to the first output terminal and the second shield layer being electrically connected to the second output terminal, whereby the first and second shield layers serve as leads for the magnetoresistive sensing element thereby eliminating shorting of a sense current to the first and/or second shield layers via the first and/or second gap layers.

2. A magnetic media drive including the thin film magnetoresistive head as claimed in claim 1, the drive further comprising:

a housing;

a turntable mounted in the housing for supporting and rotating a magnetic disk; and a support including a slider mounted in the housing for supporting the thin film magnetoresistive head in an operative relationship with respect to a magnetic disk supported on the turntable.

3. A thin film magnetoresistive head as claimed in claim 1 comprising:

a pair of thin film write pole layers which are separated by a thin film gap layer, each pole layer having a bottom surface which forms a part of the air bearing surface;

one of the write pole layers being the second shield layer; and a thin film coil layer for inducing flux in the write pole layers.

4. A thin film magnetoresistive head as claimed in claim 1 comprising:

the first and second connector layers, the first and second gap layers and the first and second shield layers each having first and second thin film surfaces;

the magnetoresistive element and the connector layers being sandwiched between the first and second gap layers with the first thin film surfaces of the magnetoresistive element and the connector layers being in direct engagement with the second thin film surface of the first gap layer, and the second thin film surfaces of the magnetoresistive element and the connector layers being in direct engagement with the first thin film surface of the second gap layer; and the first and second gap layers being sandwiched between the first and second shield layers with the first thin film surface of the first gap layer being in direct engagement with the second thin film surface of the first shield layer, and the second thin film surface of the second gap layer being in direct engagement with the first thin film surface of the second shield layer.

5. A thin film magnetoresistive head as claimed in claim 1 comprising:

the second gap layer having a hole; and the second connector layer being electrically connected to the second shield layer through the hole in the second gap layer.

6. A thin film magnetoresistive head as claimed in claim 5 comprising:

the distance between each side edge of the magnetoresistive element and the respective via being approximately 5 microns.

7. A thin film magnetoresistive head as claimed in claim 6 comprising: each gap layer having a thickness in the range of 0.05 um to 0.2 um.

8. A thin film magnetoresistive head as claimed in claim 7 comprising: each of the gap layers being aluminum oxide.

9. A thin film magnetoresistive head as claimed in claim 1 comprising:

the magnetoresistive element being composed of four thin film layers;

the first layer of the magnetoresistive element being a soft film bias selected from the group NiFeRh, NiFeCr, NiFeNb and NiFeMo;

the second layer of the magnetoresistive element being insulative material; the third layer being a magnetoresistive material which changes resistance in response to flux density; and the fourth layer being a protective layer for the third layer.

10. A thin film magnetoresistive head as claimed in claim 1 comprising:

first shield layer being FeAlSi, and second shield layer NiFe with a thicknesses of approximately 2 um;

each connector layer being a material selected from the group Au, Ta, W, Rh and Ru with a thickness in the range of 200 A to 2000 A.

11. A thin film magnetoresistive head as claimed in claim 1 comprising: each gap layer having a thickness in the range of 0.05 um to 0.2 um.

12. A thin film magnetoresistive head as claimed in claim 11 comprising:

the first and second connector layers, the first and second gap layers and the first and second shield layers each having first and second thin film surfaces;

the magnetoresistive element and the connector layers being sandwiched between the first and second gap layers with the first film surfaces of the magnetoresistive element and the connector layers being in direct engagement with the second thin film surface of the first gap layer, and the second thin film surfaces of the magnetoresistive element and the connector layers being in direct engagement with the first thin film surface of the second gap layer; and the first and second gap layers being sandwiched between the first and second shield layers with the first thin film surface of the first gap layer being in direct engagement with the second thin film surface of the first shield layer, and the second thin film surface of the second gap layer being in direct engagement with the first thin film surface of the second shield layer.

13. A thin film magnetoresistive head as claimed in claim 12 comprising:

the second gap layer having a hole; and the second connector layer being electrically connected to the second shield layer through the hole in the second gap layer.

14. A disk drive, including the thin film magnetoresistive head as claimed in claim 13, the drive comprising:

a housing;

a turntable mounted in the housing for supporting and rotating a magnetic disk; and a support including a slider mounted in the housing for supporting the thin film magnetoresistive head in an operative relationship with respect to a magnetic disk supported by the turntable.

15. A thin film magnetoresistive head, comprising, a substantially rectangular magnetoresistive sensing element having top and bottom opposite bounding edges and side opposite bounding edges, the bottom edge forming a portion of an air bearing surface;

the magnetoresistive element being enclosed by first and second electrically conducting ferromagnetic shield layers;

the first and second shield layers being separated from the magnetoresistive element by first and second insulating gap layers respectively;

first and second opposite bounding edges of the magnetoresistive element being electrically connected to the first and second shield layers respectively;

first and second output terminals; and the first and second shield layers being electrically connected to the first and second output terminals respectively, whereby the first and second shield layers serve as first and second electrical leads for the magnetoresistive element thereby eliminating shorting of a sense current to the first and/or second shield layers via the first and/or second gap layers.

16. A thin film magnetoresistive head, comprising:

a magnetoresistive sensing element having two oppositely-directed film surfaces bounded by top and bottom bounding edges and side bounding edges, the bottom bounding edge forming a portion of an air bearing surface;

first and second sense current thin film connector layers, each connector layer being electrically connected to a respective bounding edge of the magnetoresistive element;

first and second thin film gap layers and first and second thin film electrically conductive shield layers;

the magnetoresistive sensing element and the first and second connector layers being located between the first and second gap layers;

the magnetoresistive sensing element, the first and second connector layers and the first and second gap layers being located between the first and second shield layers;

the first connector layer being electrically shorted to the first shield layer and the second connector layer being electrically shorted to the second shield layer;

first and second output terminals; and the first shield layer being connected to the first output terminal and the second shield layer being connected to the second output terminal so that the first and second shield layers serve as leads for the magnetoresistive sensing element;

the first shield layer being split into separate first and second portions;

the first connector layer being electrically shorted to the first portion of the first shield layer and the second connector layer being electrically shorted to the second portion of the first shield layer;

a slider for supporting the magnetoresistive element;

the sizes of the first and second portions of the first shield layer being selected so that a capacitance between the first portion of the first shield layer and the slider is substantially equal to a capacitance of a combination of the second shield layer and the second portion of the first shield layer with respect to the slider.

17. A thin film magnetoresistive head, comprising:

a magnetoresistive sensing element having two oppositely-directed film surfaces bounded by top and bottom bounding edges and side bounding edges, the bottom bounding edge forming a portion of an air bearing surface;

first and second sense current thin film connector layers, each connector layer being electrically connected to a respective bounding edge of the magnetoresistive element;

first and second thin film gap layers and first and second thin film electrically conductive shield layers, each gap layer having a thickness in the range of 0.05 µm to 0.2 µm;

the magnetoresistive element, the connector layers, the first and second gap layers and the first and second shield layers each having first and second film surfaces;

the magnetoresistive element and the connector layers being sandwiched between the first and second gap layers with the first film surface of the magnetoresistive element and the first film surfaces of the connector layers being in direct engagement with the second film surface of the first gap layer, and the second film surfaces of the magnetoresistive element and the connector layers being in direct engagement with the first film surface of the second gap layer; and the first and second gap layers being sandwiched between the first and second shield layers with the first film surface of the first gap layer being in direct engagement with the second film surface of the first shield layer, and the second film surface of the second gap layer being in direct engagement with the first film surface of the second shield layer;

the first connector layer being electrically shorted to the first shield layer and the second connector layer being electrically shorted to the second shield layer;

first and second output terminals; and the first shield layer being connected to the first output terminal and the second shield layer being connected to the second output terminal, so that the first and second shield layers serve as leads for the magnetoresistive sensing element;

the first connector layer having a via which extends through the first gap layer to the first shield layer so as to electrically short the first connector layer to the first shield layer; and the second shield layer having a via which extends through the second gap layer to the second connector layer to electrically short the second connector layer to the second shield layer the first shield layer being electrically split into first and second portions;

the first connector layer being electrically shorted to the first portion of the first shield layer and the second shield layer being electrically shorted to the second portion of the first shield layer;

a slider for supporting the magnetoresistive element; and the sizes of the first and second portions of the first shield layer being selected so that a capacitance between the first portion of the first shield layer and the slider is substantially equal to a capacitance of a combination of the second shield layer and the second portion of the first shield layer with respect to the slider.

18. A thin film magnetoresistive head as claimed in claim 17 comprising:

a pair of thin film write pole layers, each layer having a bottom surface which forms a portion of the air bearing surface;

one of the write pole layers being the second shield layer; and a thin film coil for inducing flux in the write poles.

19. A magnetic disk drive including the thin film magnetoresistive head as claimed in claim 18, the drive comprising:

a housing;

a turntable mounted in the housing for supporting and rotating a magnetic disk; and a support, including a slider, mounted in the container for supporting the thin film magnetoresistive head in an operative relationship with respect to a magnetic disk supported by the turntable.

20. A thin film magnetoresistive head as claimed in claim 18 comprising:

the distance between each side surface of the magnetoresistive element and the respective via being approximately 5 microns.

21. A thin film magnetoresistive head as claimed in claim 20 comprising: each of the gap layers being aluminum oxide.

22. A thin film magnetoresistive head as claimed in claim 21 comprising:

the magnetoresistive element being composed of four thin film layers;

the first layer of the magnetoresistive element being a soft film bias selected from the group NiFeRh, NiFeCr, NiFeNb and NiFeMo;

the second layer of the magnetoresistive element being insulative material;

the third layer being a magnetoresistive material which changes resistance in response to flux density; and the fourth layer being a protective layer for the third layer.

23. A thin film magnetoresistive head as claimed in claim 22 comprising:

each of the shield layers being FeAlSi with a thickness of approximately 2 μm;

each connector layer being a material selected from the group Au, Ta, W, Rh and Ru with a thickness in the range of 200 Å to 2000 Å.

24. A magnetic disk drive including the thin film magnetoresistive head as claimed in claim 23, the drive further comprising:

a housing;

a turntable mounted in the housing for supporting and rotating a magnetic disk; and a support including a slider mounted in the container for supporting the thin film magnetoresistive head in an operative relationship with respect to a magnetic disk supported by the turntable.

25. A thin film magnetoresistive head, comprising:

a substantially rectangular magnetoresistive sensing element having top and bottom opposite bounding edges and side opposite bounding edges, the bottom edge forming a portion of an air bearing surface;

the magnetoresistive element being enclosed by first and second electrically conducting ferromagnetic shield layers;

the first and second shield layers and the magnetoresistive element being separated by insulating gap layers;

first and second opposite bounding edges of the magnetoresistive element being electrically connected to the first and second shield layers respectively; and each shield layer being electrically connected to a respective external pad so that the first and second shield layers serve as first and second electrical leads for the magnetoresistive elements;

the first shield layer being split into separate first and second portions;

the first opposite edge of the magnetoresistive element being connected to only the first portion of the first shield layer; and the second portion of the first shield layer being connected to the second shield layer.

26. A disk drive including the thin film magnetoresistive head as claimed in claim 25 comprising:

a housing;

a turntable mounted in the housing for supporting and rotating a magnetic disk; and a support including a slider mounted in the housing for supporting the thin film magnetoresistive head in an operative relationship with respect to a magnetic disk supported by the turntable.

27. A thin film magnetoresistive head as claimed in claim 25 comprising:

said first and second opposite bounding edges being first and second side opposite bounding edges respectively.

28. A thin film magnetoresistive head as claimed in claim 27 comprising:

the first and second side opposite bounding edges being connected to the first portion of the first shield layer and the second shield layer respectively by first and second connecting layers respectively.

29. A thin film magnetoresistive head as claimed in claim 25 comprising:

said first and second opposite bounding edges being top and bottom opposite bounding edges respectively.

30. A thin film magnetoresistive head as claimed in claim 29 comprising:

the top and bottom edges being connected to the first portion of the first shield layer and the second shield layer respectively by first and second connecting layers respectively.

31. A thin film magnetoresistive (MR) head, comprising:

a magnetoresistive sensing element;

first and second sense current connector layers connected to the magnetoresistive element in a spaced apart relationship;

the magnetoresistive element and at least one of the first and second connector layers being sandwiched between first and second gap layers which are, in turn, sandwiched between first and second electrically conductive shield layers;

the first connector layer being electrically connected to the first shield layer and the second connector layer being electrically connected to the second shield layer;

first and second output terminals; and the first shield layer being electrically connected to the first output terminal and the second shield layer being electrically connected to the second output terminal, whereby the first and second shield layers serve as first and second lead layers for conducting signals from the magnetoresistive element to the first and second output terminals thereby eliminating shorting of a sense current to the first and/or second shield layers via the first and/or second gap layers.

32. An MR head as claimed in claim 31 including: one of the first and second gap layers having a first hole and one of the first and second connector layers being connected to one of the first and second shield layers through said first hole.

33. An MR head as claimed in claim 32 including:

the other one of the first and second gap layers having a second hole and the other one of the first and second connector layers being connected to the other one of the first and second shield layers through said second hole.

34. An MR head as claimed in claim 33 including:

each of the first and second connector layers having an edge which forms a part of an air bearing surface.

35. An MR head as claimed in claim 34 including:

each of the first and second holes being recessed from said air bearing surface.

36. An MR head as claimed in claim 32 including:

said one of the first and second connector layers being recessed from an air bearing surface;

the other one of the first and second connector layers having an edge which forms a part of the air bearing surface; and said other one of the first and second connector layers and its edge extending between and making contact with the magnetoresistive element and the other one of the first and second shield layers at the air bearing surface.

* * * * *

UNITED STATES PATENT AND TRADEMARK OFFICE
CERTIFICATE OF CORRECTION

PATENT NO. : 5,557,492
DATED : September 17, 1996
INVENTOR(S) : Gill et al.

It is certified that error appears in the above-indentified patent and that said Letters Patent is hereby corrected as shown below:

COVER page, item [57] ABSTRACT

Line 7, change "and" to --is located--.

Signed and Sealed this

First Day of July, 1997

*Attest:*

BRUCE LEHMAN

*Attesting Officer*     *Commissioner of Patents and Trademarks*